(12) United States Patent
Dahl et al.

(10) Patent No.: US 10,711,856 B2
(45) Date of Patent: Jul. 14, 2020

(54) BRAKE CALIPER TOOL

(71) Applicant: A & E INCORPORATED, Racine, WI (US)

(72) Inventors: Vincent Dahl, Kenosha, WI (US); Scott Davis, Racine, WI (US); Jeffrey Kuzmic, Wind Lake, WI (US)

(73) Assignee: A & E INCORPORATED, Racine, WI (US)

( * ) Notice: Subject to any disclaimer, the term of this patent is extended or adjusted under 35 U.S.C. 154(b) by 207 days.

(21) Appl. No.: 15/598,093

(22) Filed: May 17, 2017

(65) Prior Publication Data

US 2018/0335097 A1 Nov. 22, 2018

(51) Int. Cl.
*F16D 65/00* (2006.01)
*B25B 27/00* (2006.01)

(52) U.S. Cl.
CPC ...... *F16D 65/0043* (2013.01); *B25B 27/0035* (2013.01)

(58) Field of Classification Search
CPC ... B25B 27/0035; B25B 13/463; B25B 27/00; B25B 27/0021; B60T 17/22; B60T 17/221; F16D 65/0043
USPC ................. 29/278; 81/60–62, 485
See application file for complete search history.

(56) References Cited

U.S. PATENT DOCUMENTS

| | | | | |
|---|---|---|---|---|
| 1,339,448 A * | 5/1920 | Viktor | ...... | B25B 5/109 269/3 |
| 2,170,535 A * | 8/1939 | Marsden | ...... | G04D 1/025 81/6 |
| 2,650,735 A * | 9/1953 | Redmond | ...... | B25B 7/02 72/392 |
| 3,835,522 A * | 9/1974 | Ward | ...... | B60T 17/221 29/239 |
| 4,744,132 A * | 5/1988 | Greene | ...... | B25B 27/023 29/229 |
| 5,018,261 A * | 5/1991 | Markous | ...... | B25B 27/023 29/239 |
| 5,269,053 A * | 12/1993 | Hicks | ...... | B25B 27/0035 29/239 |
| 5,829,739 A * | 11/1998 | Hofmann | ...... | G11B 5/84 269/43 |
| 6,085,398 A * | 7/2000 | Arch | ...... | B25B 27/0035 29/239 |
| 6,192,566 B1 * | 2/2001 | Dunum | ...... | B25B 27/0035 29/233 |
| D457,795 S * | 5/2002 | Mohammed | ...... | D8/51 |
| 6,523,238 B1 * | 2/2003 | Priddy | ...... | B25B 27/0021 29/239 |

(Continued)

OTHER PUBLICATIONS

A&E Incorporate drawing sheet entitled Disc Brake Tool with Wrench; Part No. DV-3251; dated Feb. 21, 2011.

(Continued)

*Primary Examiner* — Tyrone V Hall, Jr.
*Assistant Examiner* — Abbie E Quann
(74) *Attorney, Agent, or Firm* — Ryan Kromholz & Manion, S.C.

(57) ABSTRACT

A tool for retracting pistons into cylinder bores is disclosed, with a narrow gap between facing pressure plates allowing use of the tool in tight places, and ratcheting spreading of the facing pressure plates causing outward moving of the pistons, enabling work to be performed.

5 Claims, 3 Drawing Sheets

(56) References Cited

U.S. PATENT DOCUMENTS

| | | | |
|---|---|---|---|
| 6,574,846 B1* | 6/2003 | Kang | B25B 27/0021 29/239 |
| 6,678,931 B1* | 1/2004 | Tatasciore | B25B 27/0035 29/239 |
| 6,925,696 B1* | 8/2005 | Williams | B25B 27/026 29/252 |
| 7,155,792 B1* | 1/2007 | Miller, Jr. | B25B 5/068 29/239 |
| 7,996,972 B2 | 8/2011 | Chih | |
| 8,393,063 B2* | 3/2013 | Hodges | B25B 5/068 269/128 |
| 8,505,177 B2* | 8/2013 | Chen | B25B 5/068 269/3 |
| 8,621,692 B1* | 1/2014 | Kring | A61G 13/101 248/228.3 |
| 8,661,638 B2* | 3/2014 | Chen | B25B 27/0035 29/239 |
| 8,661,639 B2* | 3/2014 | Bondielli | E04F 21/0092 29/243.5 |
| 8,826,504 B1* | 9/2014 | Slivon | B25B 27/0035 29/239 |
| 9,174,330 B2* | 11/2015 | Chen | B25B 27/0035 |
| 9,309,937 B2* | 4/2016 | Chen | F16D 65/0043 |
| 9,376,300 B2* | 6/2016 | Yang | F16D 65/0043 |
| 9,683,620 B2* | 6/2017 | Buchanan | B25B 5/068 |
| 9,695,893 B2* | 7/2017 | Huang | F16D 65/0043 |
| 2004/0123438 A1* | 7/2004 | Kang | B25B 27/0021 29/239 |
| 2004/0134052 A1* | 7/2004 | Ploeger | B25B 27/0035 29/239 |
| 2005/0000073 A1* | 1/2005 | Ploeger | B25B 27/0035 29/239 |
| 2011/0010906 A1* | 1/2011 | Mitchell | B25B 27/0035 29/239 |
| 2011/0179616 A1* | 7/2011 | Oachs | B25B 27/023 29/259 |
| 2012/0108112 A1* | 5/2012 | Vernica | H01R 4/36 439/801 |
| 2012/0204393 A1* | 8/2012 | Gentner | B25B 27/0035 29/257 |
| 2018/0335097 A1* | 11/2018 | Dahl | B25B 27/0035 |

OTHER PUBLICATIONS

Alltools WA Pty Ltd: Online Shop; Disc brake pad spreader; .alltools.com.au/shop/index.php/556/2453-Disc-Brake-Pad-Spreader; Jul. 16, 2010.

Snap-on; Pad Spreader, ://buy1.snapon.com/catalog/printPage.asp?tool=all&item-id=12411&PartNo=YA244; Dec. 10, 2010.

Snap-on; Press, Break Piston, ://buy1.snapon.com/catalog/printPage.asp?tool=all&item-id=72215&PartNo=BT350'; Dec. 10, 2010.

Snap-on; Press, Break Caliper, ://buy1.snapon.com/catalog/printPage.asp?tool=all&item-id=88695&PartNo=BTCP1; Dec. 10, 2010.

Snap-on; Spreader (for standard 4-piston caliper disc brakes); ://buy1.snapon.com/catalog/printPage.asp?tool=all&item-id=12412&PartNo=GA395; Dec. 10, 2010.

Snap-on; Tool, Universal Break Caliper, Left Hand Thread, ://buy1.snapon/catalog/printPage.asp?tool=all&item-id=75281&PartNo=YA642; Dec. 10, 2010.

The Tool Warehouse, CalVan Tools 700 Heavy-Duty Universal Disc Brake Pad Spreader; .the toolwarehouse.net/shop/media/TN-CAL-700.jpg; Jul. 3, 2008.

Toolfetch; CalVan Tools 700 Heavy-Duty Universal Disc Pad Spreader; .toolfetch.com/Catagory/Automotive/Brake-Tools/CAL700,htm; Jul. 16, 2012.

* cited by examiner

BRAKE CALIPER TOOL

BACKGROUND OF THE INVENTION

In the repair of motorcycles and smaller automotive vehicles and, more particularly, with respect to the repair of vehicle braking systems having disc brakes, various special tools are desirable. Disc brakes typically include a caliper housing which is positioned adjacent a vehicle wheel assembly having a rotor or brake disc rotatably mounted therewith. The caliper housing is associated with at least one piston which moves back and forth in a cylinder, and includes a pair of opposed brake pads for clamping the rotor in response to movement of the piston. When a vehicle operator activates a foot brake or a handle brake, brake fluid is forced from a master cylinder into the cylinder associated with the caliper housing to push the piston(s), and force engagement of the brake pads against the rotor to stop rotation of the wheel. When linings of the brake pads are worn too thin under a certain thickness after a period of use, the brake pads are required to be replaced with new ones to maintain a proper braking force during driving. However, with a continuous wearing to the linings of the brake pads, the piston gradually travels outwardly into the interior of the caliper housing to make the space of accommodating the brake pads progressively narrower. In such circumstances, the caliper housing is typically removed from the wheel assembly for the vehicle, and a special tool is used to spread the brake pads apart and/or to force or press the piston(s) back to an initial position in the cylinder(s) after which the brake pads can be replaced. The caliper housing can then be reinstalled in the wheel assembly and positioned with the new brake pads adequately accommodated in the caliper housing for engagement with the rotor.

A variety of spreader and brake press tools are known to be used by mechanics responsible for the repair of disc brakes and the replacement of brake pads. A difficulty with these tools, however, is the manual effort often required to effect retraction of the one or more pistons associated with the caliper housing. Accordingly, there remains a need in servicing brake pads to provide a tool for effectively retracting the one or more pistons of various caliper housing designs with improved mechanical advantage and ease of use.

SUMMARY OF THE INVENTION

The present disclosure relates to a disc brake piston retractor tool for retracting at least one piston into at least one cylinder bore of a caliper assembly provided with a set of brake pads to be serviced.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
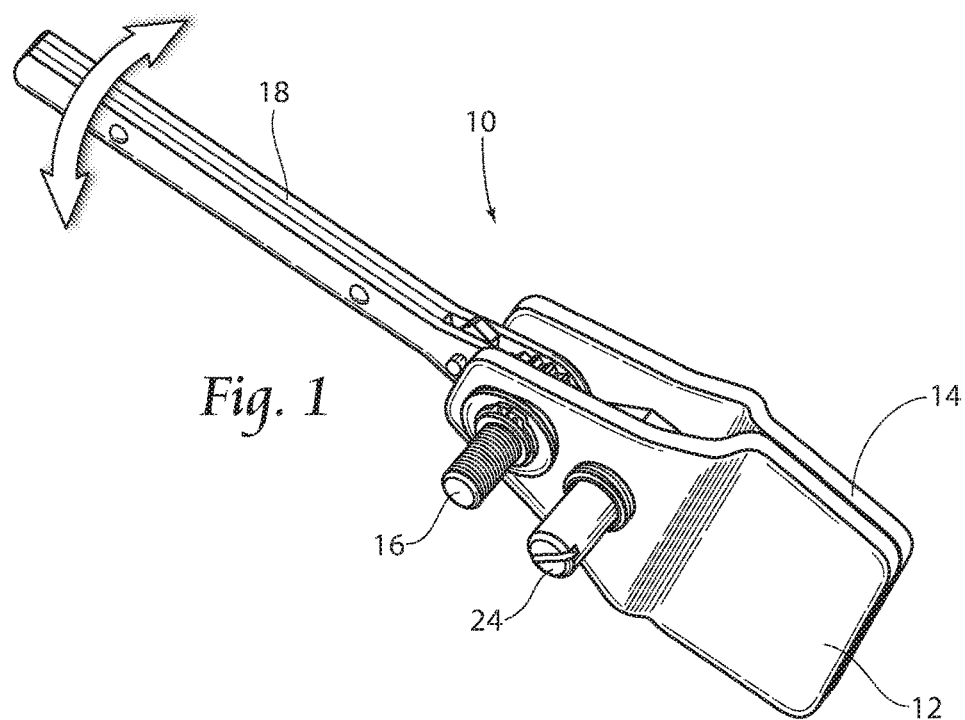
FIG. 1 is a perspective view of a disc brake caliper tool according to the present invention.
Figure 2:
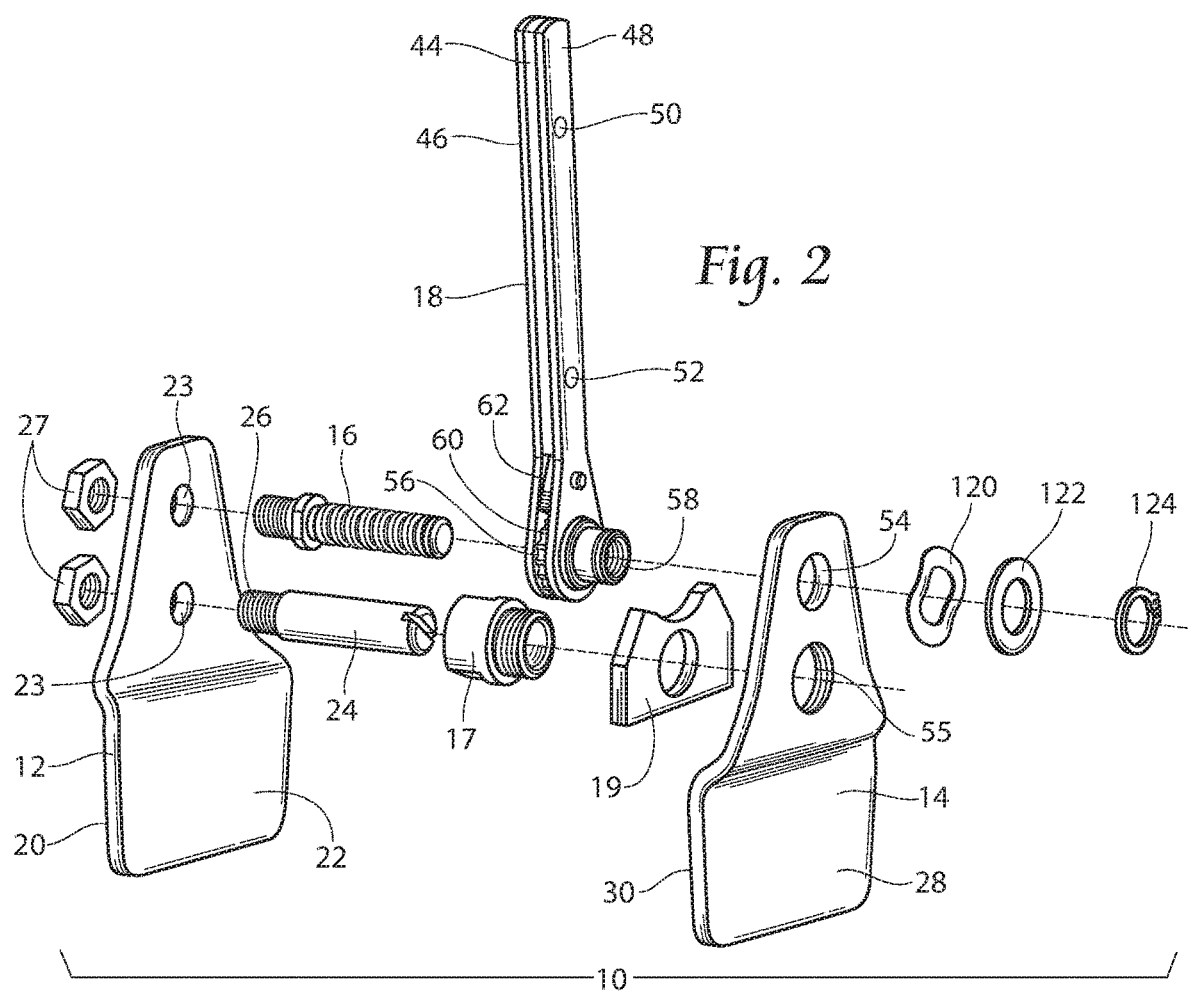
FIG. 2 is an exploded view of the brake caliper tool of FIG. 1.
Figure 3:
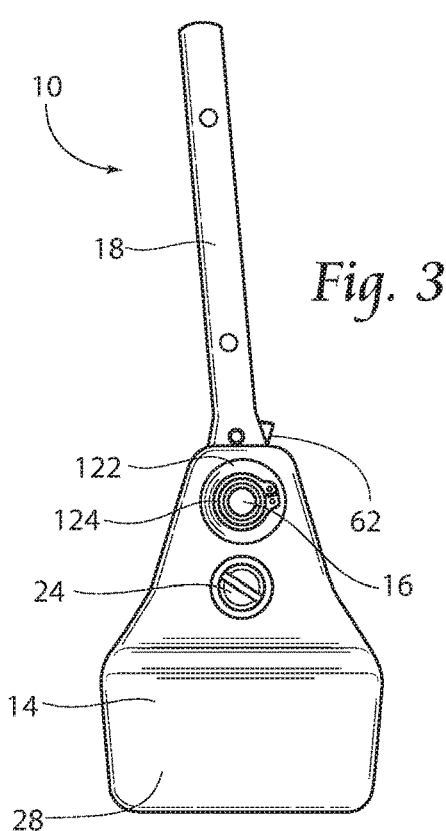
FIG. 3 is a side view of the tool shown in FIG. 1.

Referring now to the drawings, FIG. 1 illustrates a hand tool in the form of a disc brake piston retractor tool 10 used for compressing one or more pistons 142 (See FIGS. 6, 7) into a caliper housing 140 (See FIGS. 6, 7) when replacing a set of brake pads installed therein.

The tool 10 is generally comprised of a first pressure plate 12, a second pressure plate 14, a coupler 16 interconnecting the first and second pressure plates 12, 14 and a reversible ratchet wrench assembly 18 connected to the coupler 16.

Referring to FIGS. 2-6, the pressure plates 12, 14 are substantially identical in shape and thickness and are preferably constructed of steel. The first pressure plate 12 has an outer surface 20 and an inner surface 22 provided with a first stud 24 with external threads 26 extending substantially perpendicular from the inner surface 22. Coupler 16 and stud 24 are coupled to the first pressure plate 12, preferably threadedly through voids 23 and carried by nuts 27 about the plate 12.

Stud 24 is mated through coupling 17, preferably threaded into threads of void 55, and intervening coupler spacer 19.

The second pressure plate 14 has an outer surface 28 and an inner surface 30 provided with a first hole 54 and a second hole 55, both extending from the inner surface 30 through the outer surface 28.

Figure 4:
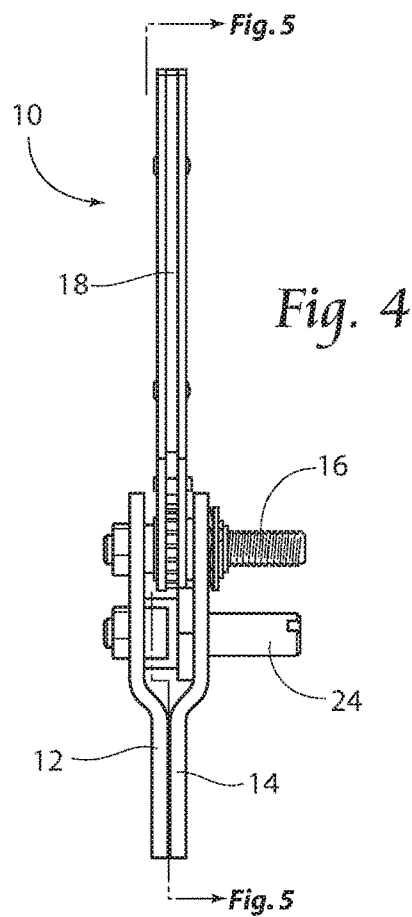
FIG. 4 is a front view of the tool shown in FIG. 1.
Figure 5:
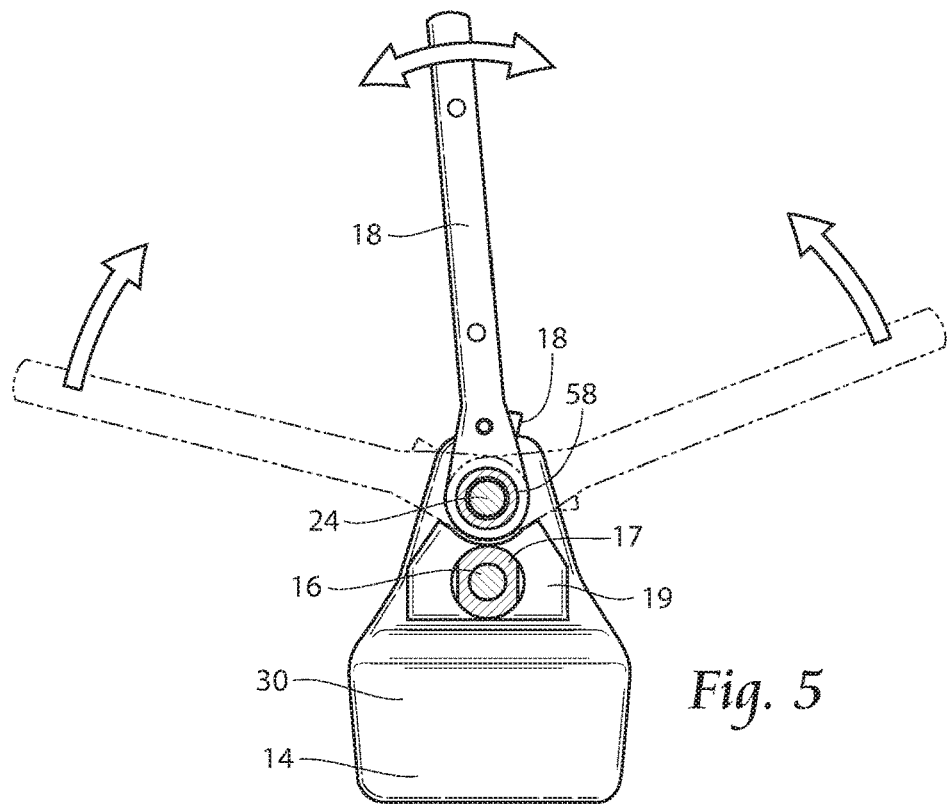
FIG. 5 is a side of the tool shown in FIG. 1.
Figure 6:
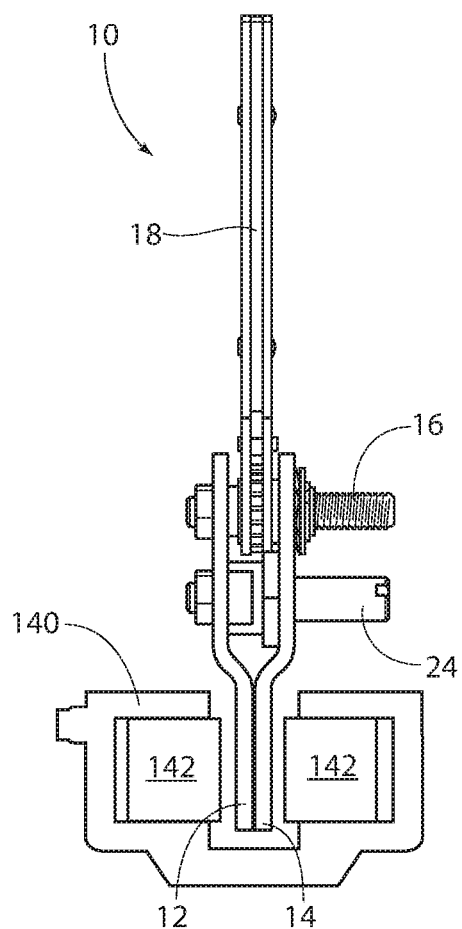
FIGS. 6 and 7 illustrate the tool of FIG. 1 in use.
Figure 7:
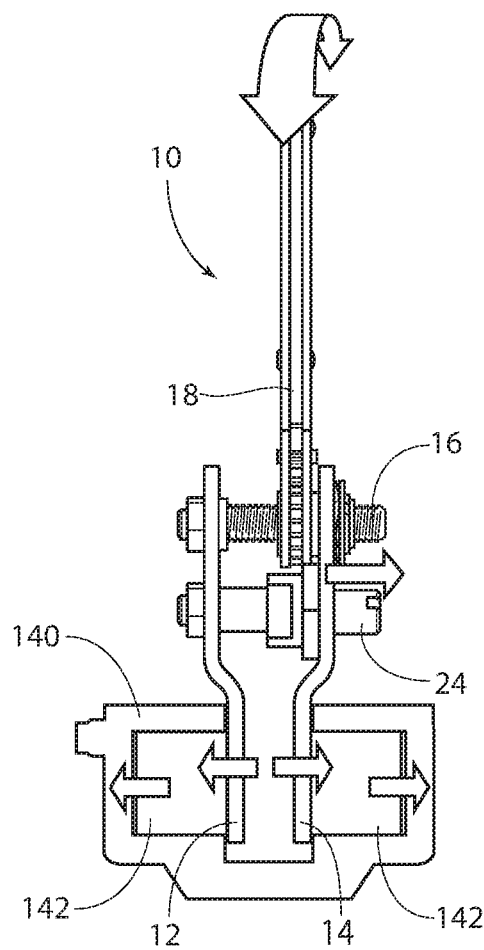

The coupler 16 preferably has a cylindrical hollow body 58 with internal threads which matingly receive the threads of the first stud 16. The coupler 16 is directly engaged with the reversible ratchet wrench assembly 18 and preferably extends through the first hole 54 beyond the outer surface 28 of the second pressure plate 14. The coupler 16 is retained within the first hole 54 by a snap ring 124, preferably also by locking washers/nuts 120/122 placed about the periphery of the coupler 16 beyond the outer surface 28. Coupler 16 is thus rotatably mounted relative to the first stud 24 and the first and second pressure plates 12, 14 about an axis that is perpendicular to the pressure plates 12, 14. Because of the particular threaded relationship among the first stud 24 with the coupler 16, it should be understood that rotation of the coupler in clockwise or counterclockwise directions will result in simultaneous lateral movement along the first stud 24 and move the pressure plates 12, 14 to either an extended position of the tool 10 as illustrated in FIG. 7, or a fully retracted of the tool 10 as illustrated in FIGS. 1, 4 and 6.

The reversible ratchet wrench assembly 18 shown is operated similarly to that shown in U.S. Pat. No. 8,826,504, incorporated herein by reference. As there described, the ratchet, wrench 18 is incorporated into the tool 10 in order to simplify the bi-directional rotation of the coupler 16, and the selective movement of the pressure plates 12, 14. The reversible ratchet wrench assembly 18 includes an elongated spacer bar 44 which is rigidly interconnected between a first handle plate 46 and a second handle plate 48 by a pair of rivets 50, 52. The handle plates 46, 48 are held spaced apart at their front ends by the spacer bar 44, and are provided with aligned central apertures which receive the coupler 16 so that the handle plates 46, 48 may rotate about the periphery of coupler 16 during ratcheting of the wrench assembly 18.

A ratcheting wheel 56 has a central hole formed by a circular inner wall 58 which is fixed to the outer surface of the coupler 16 in the center area thereof. The ratcheting wheel 56 has an outer periphery formed with a plurality of spaced apart ratchet notches 60. The ratcheting wheel 56 is positioned between facing inner surfaces of the spaced apart handle plates 46, 48, and is designed to rotate in fixed relationship with the coupler 16 relative to the first stud 24 threaded therein.

A reversible pawl 62 is mounted for pivotal movement between the spaced apart handle plates 46, 48 on a rivet which further joins the handle plates 46, 48.

A bushing 17 is received within the second hole 55 of the second pressure plate 14. The stud 24 extends from the inner surface 22 of trio first pressure plate 12 and through the bushing 17. When assembled, appropriate setting of the pawl 62 and rotation of the wrench assembly 18 will cause the first stud 24 to be threaded or unthreaded relative to the coupler 16 so that the spacing between the pressure plates 12, 14 can be adjusted between a fully retracted position (FIGS. 1, 4 and 6) and an extended position (FIG. 7). During the retracting or extending process, the stud 24 slides within the bushing 17. The stud 24 inhibits rotation of the first and second pressure plates 12,14 relative to each other during the retracting and extending processes.

The coupler 16 and the wrench assembly 18 are rotatable about an axis which is perpendicular to the pressure plates 12, 14.

As depicted here, the first and second pressure plate 12, 14 are offset towards, each other. This configuration allows for the first and second pressure plates 12,14 to make contact with each other when in the fully retracted position.

Use of the tool 10 is illustrated in FIGS. 6 and 7. When it is desired to replace a set of worn brake pads, which preferably have been disassembled from a caliper housing 14—removed from a wheel assembly, the tool 10 in a retracted position is placed within an interior space of the caliper housing 140 such that pressure plate 12 is engaged against a fixed wall of the caliper housing 140, and pressure plate 14 is facing one or more of the outwardly extending pistons 142 projecting opposite the fixed wall. The wrench assembly 18 is then operated to move the plates 12, 14 progressively outwardly towards the extended position in which pressure plate 14 pushes the one or more pistons 140 back into their initial position (in the direction of arrows) within their cylinder (s) associated with the caliper housing 140. Once the pistons 142 have been retracted, the tool 10 can be removed from the caliper housing 82. The pressure on the pistons 142 is usually inadequate or released such that pad mounting surfaces on the pistons 142 remain in an acceptable spread condition. The brake pads may then be easily replaced and the caliper housing 82 may be reassembled with the wheel assembly.

Although not illustrated, it should be understood that certain caliper housings are designed with one set of pistons on one wall, and another set of pistons on another wall spaced from the one wall so that the sets of pistons are spaced apart and face each other. In this case, the tool 10 is placed in the caliper housing such that one pressure plate 12 is designed to push against and retract the one set of pistons into their respective cylinder bores, and the other pressure plate is designed to push against and retract the other set of pistons into their respective cylinder bores.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A disc brake piston retractor tool for retracting at least one piston into at least one cylinder bore a caliper assembly provided with a set of brake pads to be serviced, the tool comprising:
   a handle,
   a ratcheting mechanism carried by said handle;
   a first and a second pressure plate operable in response to said ratcheting mechanism,
   a coupler threadedly carried through said ratcheting mechanism, said coupler mating at least one of said first pressure plate and said second pressure plate and axially carrying at least one of said first pressure plate and said second pressure plate toward and away from the other of said first pressure plate and said second pressure plate,
   a stud carried by said first and second plates, said stud carrying a bushing coupled to at least one of said first and second plates;
   said first plate comprising a first flat portion, a second portion depending inwardly from said first flat portion, and a third portion substantially parallel to said first flat portion;
   said second plate comprising a first flat portion, a second portion depending inwardly from said first flat portion, and a third portion substantially parallel to said first flat portion;
   wherein said inwardly depending portions may be carried toward one another until said plates are in contact with one another.

2. A disc brake piston retractor tool according to claim 1, said coupler mating said first pressure plate and said second pressure plate through an aperture on said first pressure plate and through an aperture on said second pressure plate.

3. A disc brake piston retractor tool according to claim 1, said stud sliding within said bushing in response to said ratcheting mechanism.

4. A disc brake piston retractor tool comprising:
   a handle,
   a ratcheting mechanism carried said handle;
   a first and a second pressure plate connected to one another by way of a bushing assembly and operable in response to said ratcheting mechanism, wherein said first and second pressure plates have a first portion configured for containing said assembly and a second portion configured for applying pressure against the piston of a brake caliper housing, wherein the second portion of the first pressure plate and the second portion of the second pressure plate can be moved toward one another until said plates are touching one another.

5. The disc brake piston retractor tool according to claim 1, said first portion of first and second pressure plates being oriented essentially parallel to one another at a first distance and said second portion of first and second pressure plates being oriented essentially parallel to one another at a second distance, wherein the first distance is larger than the second distance.

* * * * *

UNITED STATES PATENT AND TRADEMARK OFFICE
CERTIFICATE OF CORRECTION

PATENT NO. : 10,711,856 B2
APPLICATION NO. : 15/598093
DATED : July 14, 2020
INVENTOR(S) : Vincent Dahl, Scott Davis and Jeffrey Kuzmic It is certified that error appears in the above-identified patent and that said Letters Patent is hereby corrected as shown below:

In the Claims

Claim 4, Line 45:
"a ratcheting mechanism carried said handle;"
Should read:
--- a ratcheting mechanism carried by said handle: ---

Signed and Sealed this
Fifth Day of July, 2022

Katherine Kelly Vidal
*Director of the United States Patent and Trademark Office*